No. 707,294. Patented Aug. 19, 1902.
C. D. BLACKHALL.
PAPER CUTTING MACHINE.
(Application filed Nov. 22, 1901.)
(No Model.)
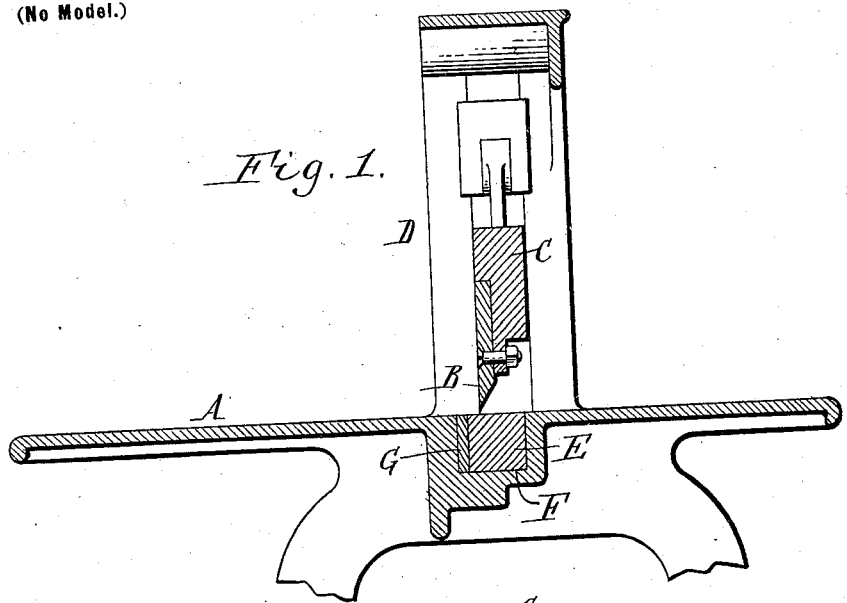
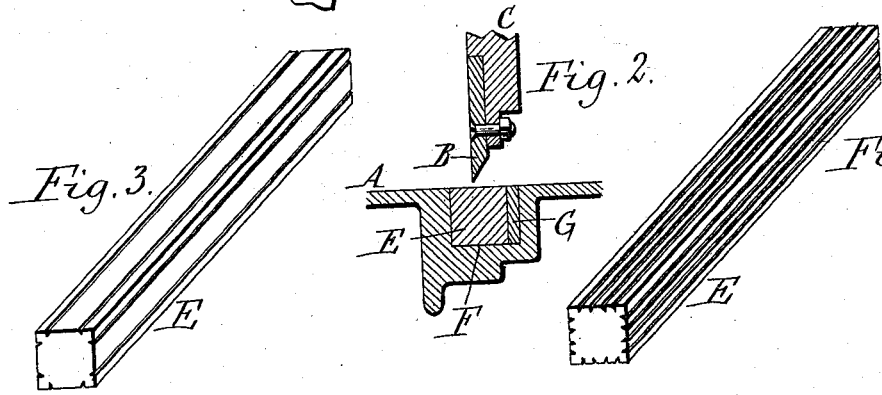
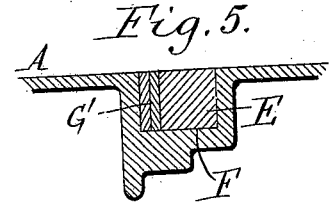 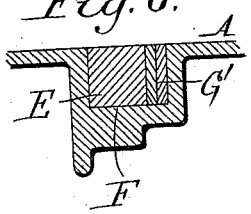 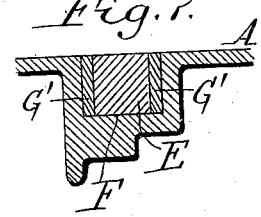
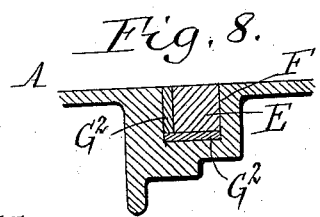 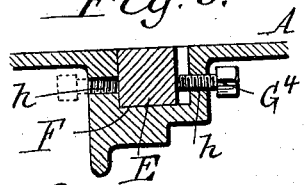
Witnesses:
Louis C. W. Gratz.
Emma M. Graham.
Charles D. Blackhall, Inventor
By Geyer & Popp,
Attorneys.

UNITED STATES PATENT OFFICE.

CHARLES D. BLACKHALL, OF BUFFALO, NEW YORK.

PAPER-CUTTING MACHINE.

SPECIFICATION forming part of Letters Patent No. 707,294, dated August 19, 1902.

Application filed November 22, 1901. Serial No. 83,253. (No model.)

*To all whom it may concern:*

Be it known that I, CHARLES D. BLACKHALL, a citizen of the United States, residing at Buffalo, in the county of Erie and State of New York, have invented new and useful Improvements in Paper-Cutting Machines, of which the following is a specification.

This invention relates to the wooden cutting-sticks employed on the tables of paper-cutting machines for protecting the edge of the reciprocating knife. The knife is usually offset with reference to the longitudinal center line of the stick, which latter is square in cross-section, and as ordinarily constructed and used the stick is removably seated in a corresponding groove or socket of the table in such manner that it can be given a quarter-turn from time to time for bringing a fresh surface opposite the knife and also reversed end for end after an objectionable slit has been cut in each of its four sides, so as to present a second set of fresh surfaces to the knife, thus permitting the stick to be operated upon by the knife at two places on each of its faces before requiring the stick to be discarded.

The object of my invention is to so construct the cutting-stick and the socket which receives it that the shifting or adjusting capacity of the stick is increased, thus enabling a larger area of its surface to be utilized and lengthening its life accordingly.

In the accompanying drawings, Figure 1 is a vertical longitudinal section of the upper portion of a paper-cutting machine containing my invention. Fig. 2 is a similar view of the central portion of the machine, showing a different position of the cutting-stick. Fig. 3 is a perspective view of the cutting-stick, showing the location of the slits after the stick has been turned and reversed in the ordinary manner. Fig. 4 is a similar view of the stick after having been shifted as well as turned and reversed. Figs. 5, 6, 7, 8, and 9 are vertical sections similar to Fig. 2, showing modified forms of my invention.

Like letters of reference refer to like parts in the several figures.

A indicates the table of the machine, and B the knife or cutter-blade. The knife is carried by the usual reciprocating cross-head C, which slides in vertical guides in the customary standards D.

E indicates the cutting-stick, which may have the usual square cross-section, and F is the groove or socket in the table which receives the stick. This socket may be as deep as the thickness of the stick to bring the upper surface of the stick flush with the table; but instead of making the socket as wide as the stick, as heretofore, it is constructed of somewhat greater width than the same, as shown in Figs. 1 and 2, so that the stick can be shifted bodily sidewise in the socket for bringing different portions of its upper surface opposite the knife. The space not occupied by the stick is filled by a removable filling or strip G of the proper thickness to fit snugly therein and of the required width or depth to be flush with the surface of the table. Upon removing this filling-strip the cutting-stick can be slid laterally against either wall of its socket, and after shifting the stick the filling-strip is replaced between the opposite wall of the socket and the stick. Figs. 1 and 2 show the stick in these two positions. By this construction the cutting-stick can be turned and reversed like the ordinary stick without changing the position of the filling-strip G, and after the stick has passed through the ordinary cycle of positions it can also be shifted sidewise in either direction in each of its four main positions, thus enabling two additional portions of the surface of each side to be brought opposite the knife and permitting the stick to receive four slits on each side or sixteen in all before becoming unserviceable. The ordinary stick must be renewed after having each side slitted in two places or eight in all, and by the form of my improvement shown in Figs. 1 and 2 the life of the stick is thus doubled. In order to accomplish this result, the stick must be wider than the distance between the edge of the knife B and either wall of the stick-groove F. If desired, two or more of such filling-strips may be used, as shown at G' in Figs. 5, 6, and 7, where two strips are employed. In this case both strips may be placed either at the right or the left hand side of the stick, as seen in Figs. 5 and 6, or at opposite sides of the same, as shown in Fig. 7. By this modified construction the number of lateral shifts or adjustments of the stick in each of its four main positions is correspondingly multiplied.

My improvement may be applied to existing paper-cutting machines having the usual square stick-socket by making the stick smaller than the socket in both cross-sectional dimensions, as shown in Fig. 8, and employing a supplemental filling-strip $G^2$ between the bottom of the socket and the stick in addition to the filling-strip $G^3$, inserted between one side of the stick and the opposing wall of the socket.

In lieu of a filling-strip any other suitable device may be employed for holding the cutting-stick against lateral displacement in its socket. For instance, a set-screw $G^4$ may be used, as shown in Fig. 9, in which case the socket is provided in both of its vertical walls with screw-threaded openings $h$, in either of which the set-screw may be placed for clamping the cutting-stick against one or the other of said walls.

I claim as my invention—

1. The combination with the table of a paper-cutting machine provided with a groove, of a knife arranged over said groove, a cutting-stick seated in the groove and made narrower than the same, but wider than the distance between the edge of the knife and either wall of the groove, whereby when seated at either side of said groove it will oppose the knife, and a retaining device for holding the cutting-stick against lateral displacement, substantially as set forth.

2. The combination with the table of a paper-cutting machine provided with a groove, of a laterally-adjustable cutting-stick seated in said groove and made narrower than the same, a knife arranged over said groove and located at a shorter distance from both walls of the groove than the width of the cutting-stick, whereby when seated at either side of the groove the cutting-stick will oppose the knife, and a filling strip or strips arranged in the portion of said groove not occupied by the stick, substantially as set forth.

Witness my hand this 20th day of November, 1901.

CHARLES D. BLACKHALL.

Witnesses:
THEO. L. POPP,
LOUIS W. GRATZ.